US012236933B2

(12) United States Patent
Wang et al.

(10) Patent No.: US 12,236,933 B2
(45) Date of Patent: Feb. 25, 2025

(54) ACTIVE NOISE REDUCTION SYSTEM, ACTIVE NOISE REDUCTION METHOD, AND NON- TRANSITORY COMPUTER-READABLE STORAGE MEDIUM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 18/188,156

(22) Filed: Mar. 22, 2023

(65) Prior Publication Data

US 2023/0306949 A1 Sep. 28, 2023

(30) Foreign Application Priority Data

Mar. 28, 2022 (JP) ................................ 2022-051662

(51) Int. Cl.
*G10K 11/178* (2006.01)

(52) U.S. Cl.
CPC .. *G10K 11/17854* (2018.01); *G10K 11/17815* (2018.01); *G10K 11/17881* (2018.01); *G10K 2210/3045* (2013.01)

(58) Field of Classification Search
CPC ....... G10K 11/17854; G10K 11/17815; G10K 11/17881; G10K 11/17853; G10K 2210/3045; G10K 2210/3012
See application file for complete search history.

(56) References Cited

U.S. PATENT DOCUMENTS

2013/0301849 A1* 11/2013 Alderson ......... G10K 11/17881 381/71.11

FOREIGN PATENT DOCUMENTS

JP H0728474 A 1/1995

* cited by examiner

*Primary Examiner* — Ping Lee
(74) *Attorney, Agent, or Firm* — Armstrong Teasdale LLP

(57) ABSTRACT

An active noise reduction system includes a controller configured to acquire a plurality of noise signals output from a plurality of noise microphones, select a plurality of reference signals and an error signal from among the plurality of noise signals, the plurality of reference signals corresponding to a noise, the error signal corresponding to an error between the noise and a canceling sound, generate a control signal from the plurality of reference signals by using a plurality of control filters, and adaptively update the plurality of control filters by using a plurality of acoustic transmission filters. The plurality of acoustic transmission filters includes at least one adaptive update filter configured to be adaptively updated, and at least one non-adaptive update filter configured to be updated based on an update value of the adaptive update filter.

9 Claims, 12 Drawing Sheets

*Fig.7*

T1

| number of filter group | updatable filters |
|---|---|
| 1 | W1 |
| 2 | $\hat{H}_1$,$\hat{C}B_1$ |
| 3 | W2 |
| 4 | $\hat{H}_2$,$\hat{C}B_2$ |
| ... | ... |

ACTIVE NOISE REDUCTION SYSTEM, ACTIVE NOISE REDUCTION METHOD, AND NON- TRANSITORY COMPUTER-READABLE STORAGE MEDIUM

TECHNICAL FIELD

The present invention relates to an active noise reduction system, an active noise reduction method, and a non-transitory computer-readable storage medium that reduce a noise by causing a canceling sound in an opposite phase to the noise to interfere with the noise.

BACKGROUND ART

Conventionally, an active noise reduction system reduces a noise by causing a canceling sound in an opposite phase to the noise to interfere with the noise.

For example, JPH7-28474A discloses an active noise reduction system (noise canceling system) including a speaker that outputs a canceling sound, an acceleration sensor that generates a signal corresponding to a noise, an error microphone that detects a synthesized sound of the noise and the canceling sound and outputs a signal of the synthesized sound, and an adaptive signal processing unit that controls the speaker based on the signals from the acceleration sensor and the error microphone.

In the above conventional technique, the acceleration sensor that generates the signal corresponding to the noise is, in general, a relatively expensive component. Accordingly, if the signal corresponding to the noise is generated by the acceleration sensor, the active noise reduction system may become expensive.

Further, in the above conventional technique, an estimation value (see "a filter FXF") of acoustic transmission characteristics from the speaker to the error microphone is used as a control parameter. However, the acoustic transmission characteristics may change according to various factors (for example, aging of a vehicle body, the change in an opening/closing state of a window, and the change in an inclination of a seat). If the acoustic transmission characteristics change in this way, an error will be generated between the acoustic transmission characteristics and an estimation value thereof, and thus control performance (that is, noise reduction performance) of the active noise reduction system may deteriorate or an abnormal noise may be generated.

SUMMARY OF THE INVENTION

In view of the above background, an object of the present invention is to provide an inexpensive active noise reduction system that can maintain control performance even if acoustic transmission characteristics change.

To achieve such an object, one aspect of the present invention provides an active noise reduction system (11), comprising: a canceling sound output device (12A-12D) configured to output a canceling sound for canceling a noise; a plurality of noise microphones (13A-13E) configured to generate a plurality of noise signals based on the noise; and a controller (16) configured to control the canceling sound output device based on the plurality of noise signals, wherein the controller is configured to: acquire the plurality of noise signals output from the plurality of noise microphones; select a plurality of reference signals and an error signal from among the plurality of noise signals, the plurality of reference signals corresponding to the noise, the error signal corresponding to an error between the noise and the canceling sound; generate a control signal of the canceling sound output device from the plurality of reference signals by using a plurality of control filters (W); and adaptively update the plurality of control filters by using a plurality of acoustic transmission filters (C^), and the plurality of acoustic transmission filters includes: at least one adaptive update filter configured to be adaptively updated (C^B); and at least one non-adaptive update filter (C^A) configured to be updated based on an update value of the adaptive update filter.

According to this aspect, both the reference signals and the error signal can be generated by using the plurality of noise microphones. Accordingly, it is not necessary to use an expensive sensor such as an acceleration sensor to generate the reference signals, so that an inexpensive active noise reduction system can be provided. Further, by updating the plurality of acoustic transmission filters, it is possible to cause the plurality of acoustic transmission filters to follow the change in acoustic transmission characteristics. Accordingly, even if the acoustic transmission characteristics change, control performance of the active noise reduction system can be maintained, so that the noise can be effectively reduced. Furthermore, the non-adaptive update filter is updated based on the update value of the adaptive update filter. Accordingly, the calculation amount (calculation load) of the controller can be reduced as compared with a case where all the acoustic transmission filters are adaptively updated. Accordingly, it is possible to form the controller by a relatively inexpensive processor.

In the above aspect, preferably, the at least one adaptive update filter comprises a plurality of adaptive update filters, and the controller is configured to: calculate estimation values of the plurality of adaptive update filters by applying a prescribed averaging process to update values of the plurality of adaptive update filters; and update the non-adaptive update filter based on the estimation values of the plurality of adaptive update filters.

According to this aspect, even if the update values of the plurality of adaptive update filters vary, the estimation values of the plurality of adaptive update filters can be calculated accurately. Accordingly, the control performance of the active noise reduction system can be improved.

In the above aspect, preferably, the at least one adaptive update filter comprises a plurality of adaptive update filters, and the controller is configured to adaptively update one of the plurality of adaptive update filters based on an update value of another of the plurality of adaptive update filters.

According to this aspect, the variation in the update values of the plurality of adaptive update filters can be suppressed. Accordingly, the control performance of the active noise reduction system can be improved.

In the above aspect, preferably, the controller is configured to: classify the plurality of control filters and the adaptive update filter into a plurality of filter groups; and adaptively update the plurality of control filters and the adaptive update filter for each of the plurality of filter groups in a prescribed update order.

According to this aspect, the update frequency of the control filters and the adaptive update filter can be reduced as compared with a case where all the control filters and the adaptive update filter are adaptively updated each time. Accordingly, the calculation amount of the controller can be further reduced.

In the above aspect, preferably, in a case where a variation of the adaptive update filter in one adaptive update thereof exceeds a prescribed threshold, the controller adaptively updates the adaptive update filter consecutively for a prescribed period regardless of the update order.

According to this aspect, it is possible to suppress the deterioration of the ability to follow the change in the acoustic transmission characteristics due to the decrease in the update frequency of the adaptive update filter.

In the above aspect, preferably, the controller is configured to: suspend adaptive updates of the plurality of control filters and the adaptive update filter after adaptively updating the plurality of control filters and the adaptive update filter for a prescribed period; determine whether a control effect of the noise is reduced based on the error signal while suspending the adaptive updates of the plurality of control filters and the adaptive update filter; and resume the adaptive updates of the plurality of control filters and the adaptive update filter upon determining that the control effect of the noise is reduced.

According to this aspect, it is possible to further reduce the calculation amount of the controller while suppressing the deterioration of the ability to follow the change in the acoustic transmission characteristics.

In the above aspect, preferably, the controller is configured to acquire buffer data in which the noise signals are stored in a time series, and process the noise signals for each of the buffer data.

According to this aspect, it is possible to further reduce the calculation amount of a controller (for example, a controller applied to a smart device such as a smartphone) that uses a method of processing buffer data.

To achieve the abovementioned object, one aspect of the present invention provides an active noise reduction method comprising: acquiring a plurality of noise signals output from a plurality of noise microphones (13A-13E); selecting a plurality of reference signals and an error signal from among the plurality of noise signals, the plurality of reference signals corresponding to a noise, the error signal corresponding to an error between the noise and a canceling sound; generating a control signal of the canceling sound from the plurality of reference signals by using a plurality of control filters (W); and adaptively updating the plurality of control filters by using a plurality of acoustic transmission filters (C^) including: at least one adaptive update filter (C^B) configured to be adaptively updated; and at least one non-adaptive update filter (C^A) configured to be updated based on an update value of the adaptive update filter.

To achieve the abovementioned object, one aspect of the present invention provides a non-transitory computer-readable storage medium (16*b*) comprising an active noise reduction program, wherein the active noise reduction program, when executed by a processor (16*a*), executes an active noise reduction method comprising: acquiring a plurality of noise signals output from a plurality of noise microphones (13A-13E); selecting a plurality of reference signals and an error signal from among the plurality of noise signals, the plurality of reference signals corresponding to a noise, the error signal corresponding to an error between the noise and a canceling sound; generating a control signal of the canceling sound from the plurality of reference signals by using a plurality of control filters (W); and adaptively updating the plurality of control filters by using a plurality of acoustic transmission filters (C^) including: at least one adaptive update filter (C^B) configured to be adaptively updated; and at least one non-adaptive update filter (C^A) configured to be updated based on an update value of the adaptive update filter.

According to this aspect, both the reference signals and the error signal can be generated by using the plurality of noise microphones. Accordingly, it is not necessary to use an expensive sensor such as an acceleration sensor to generate the reference signals, so that an inexpensive active noise reduction system can be provided. Further, by updating the plurality of acoustic transmission filters, it is possible to cause the plurality of acoustic transmission filters to follow the change in acoustic transmission characteristics. Accordingly, even if the acoustic transmission characteristics change, control performance can be maintained, so that the noise can be effectively reduced. Furthermore, the non-adaptive update filter is updated based on the update value of the adaptive update filter. Accordingly, the calculation amount (calculation load) of the processor can be reduced as compared with a case where all the acoustic transmission filters are adaptively updated. Accordingly, it is possible to form the controller by a relatively inexpensive processor.

Thus, according to the above aspects, it is possible to provide an inexpensive active noise reduction system that can maintain control performance even if acoustic transmission characteristics change.

BRIEF DESCRIPTION OF THE DRAWING(S)

FIG. 7 shows an update order table according to the second embodiment;

DETAILED DESCRIPTION OF THE INVENTION

Figure 1:
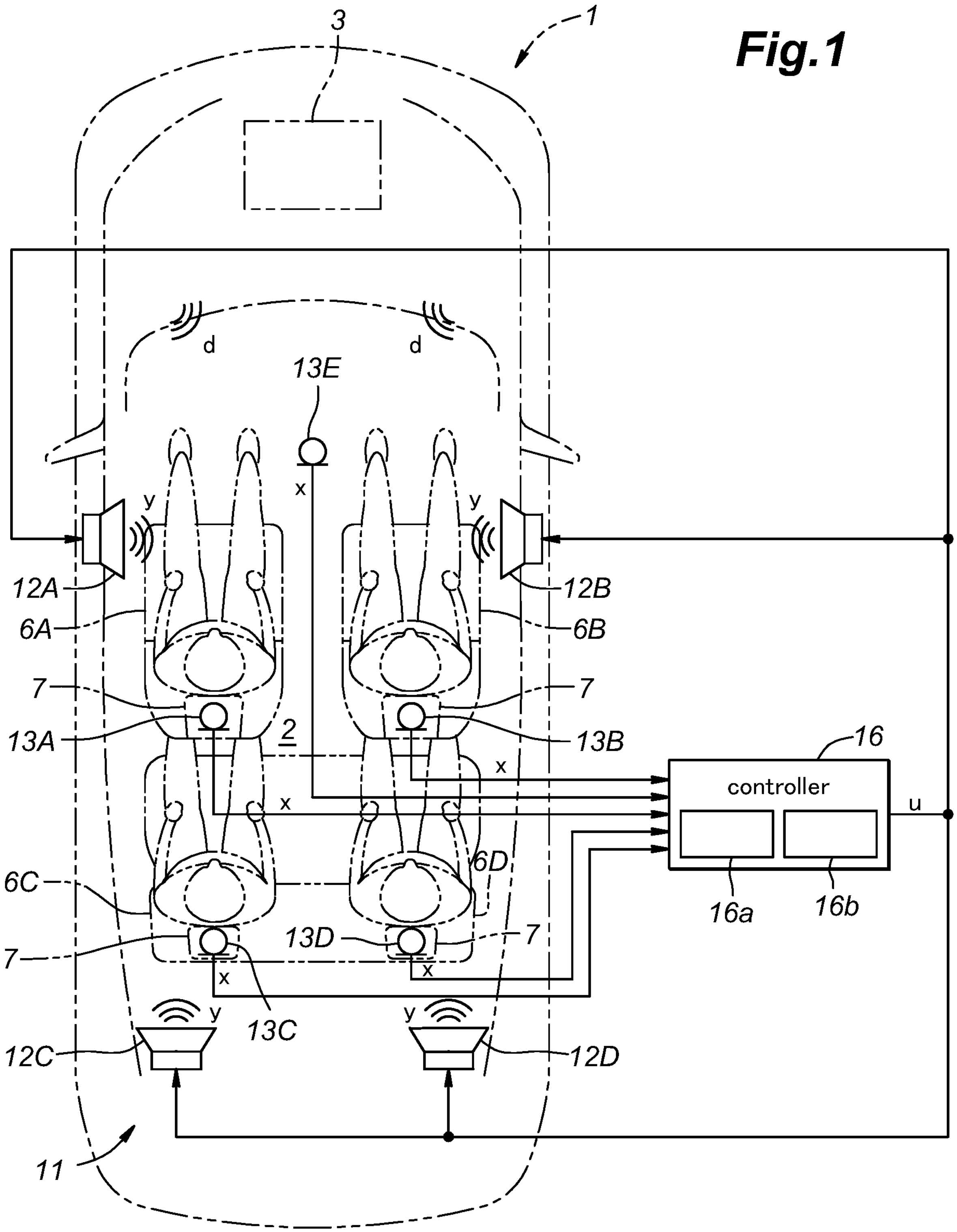
FIG. 1 is a schematic diagram showing a vehicle to which an active noise reduction system according to the first embodiment is applied.

In the following, embodiments of the present invention will be described with reference to the drawings. In this specification, "^" (circumflexes) shown together with symbols each indicate an identification value or an estimation value. "^" are shown above the symbols in the drawings and formulas, but are shown subsequently to the symbols in the text of the description.

The First Embodiment

First, the first embodiment of the present invention will be described with reference to FIGS. 1 to 5.

<The Active Noise Reduction System 11>

FIG. 1 is a schematic diagram showing a vehicle 1 to which an active noise reduction system 11 (hereinafter abbreviated as "noise reduction system 11") according to the first embodiment is applied. The noise reduction system 11 is an active noise control device (ANC device) for reducing a noise d generated in a vehicle cabin 2 of the vehicle 1. More specifically, the noise reduction system 11 reduces the noise d by generating a canceling sound y in an opposite phase to the noise d and causing the generated canceling sound y to interfere with the noise d.

For example, the noise d to be reduced by the noise reduction system 11 is a road noise caused by the vibrations of wheels due to the force from a road surface. The noise d to be reduced by the noise reduction system 11 may be a noise other than the road noise (for example, a driving noise caused by the vibrations of a driving source 3 such as an internal combustion engine or an electric motor).

Figure 2:
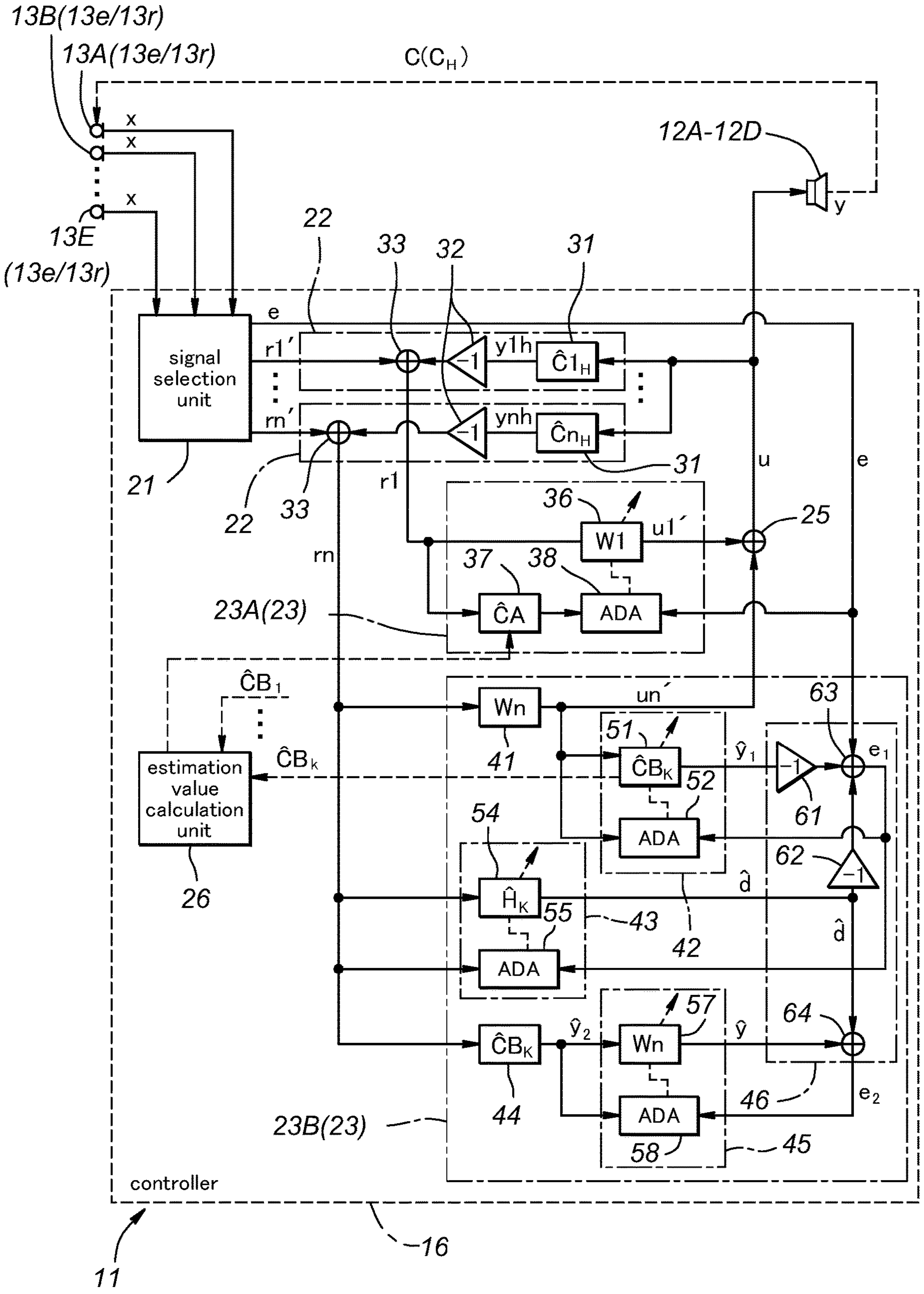
FIG. 2 is a functional block diagram showing the active noise reduction system according to the first embodiment.

With reference to FIGS. 1 and 2, the noise reduction system 11 includes a plurality of speakers 12A-12D (an example of a canceling sound output device) configured to output the canceling sound y for canceling the noise d, a plurality of noise microphones 13A-13E configured to generate a plurality of noise signals x based on the noise d, and a controller 16 configured to control the speakers 12A-12D based on the noise signals x.

<The Speakers 12A-12D>

The speakers 12A-12D of the noise reduction system 11 are arranged at positions corresponding to a plurality of occupant seats 6A-6D provided in the vehicle 1. For example, the speakers 12A, 12B are arranged in doors on both lateral sides of the front occupant seats 6A, 6B, and the speakers 12C, 12D are arranged behind the rear occupant seats 6C, 6D.

<The Noise Microphones 13A-13E>

The noise microphones 13A-13E of the noise reduction system 11 are arranged at any positions of the vehicle 1. For example, the noise microphones 13A-13D are arranged at the positions corresponding to the occupant seats 6A-6D. More specifically, the noise microphones 13A-13D are arranged in headrests 7 of the occupant seats 6A-6D. For example, the noise microphone 13E is arranged near a noise source.

<The Controller 16>

With reference to FIG. 1, the controller 16 of the noise reduction system 11 consists of a computer including a processing device 16*a* (a processor such as CPU, MPU, or the like) and a storage device 16*b* (memory such as ROM, RAM, or the like). The processing device 16*a* is an example of a processor, and the storage device 16*b* is an example of a non-transitory computer-readable storage medium. The controller 16 may consist of one piece of hardware, or may consist of a unit composed of plural pieces of hardware.

The controller 16 includes, as functional components, a signal selection unit 21, n (n≥2) pieces of howl removal units 22, n pieces of control signal output units 23, an adder 25, and an estimation value calculation unit 26.

<The Signal Selection Unit 21>

The signal selection unit 21 of the controller 16 is connected to the noise microphones 13A-13E and acquires the noise signals x output from the noise microphones 13A-13E. The signal selection unit 21 selects n pieces of reference signals r' (r1', . . . , rn') and an error signal e from among the noise signals x. The n pieces reference signals r' correspond to the noise d itself. The error signal e corresponds to an error between the noise d and the canceling sound y. The signal selection unit 21 outputs the selected reference signals r' to the howl removal units 22 and outputs the selected error signal e to the control signal output units 23.

The signal selection unit 21 may select the error signal e and the reference signals r' from the noise signals x based on the positions of the speakers 12A-12D to be controlled. For example, in controlling the speaker 12A corresponding to the occupant seat 6A, the signal selection unit 21 may select the noise signal x output from the noise microphone 13A corresponding to the occupant seat 6A as the error signal e, and select the noise signals x output from the noise microphones 13B-13E other than the noise microphone 13A as the reference signals r'. On the other hand, in controlling the speaker 12B corresponding to the occupant seat 6B, the signal selection unit 21 may select the noise signal x output from the noise microphone 13B corresponding to the occupant seat 6B as the error signal e, and select the noise signals x output from the noise microphones 13A, 13C-13E other than the noise microphone 13B as the reference signals r'.

As described above, the noise signal x output from the noise microphone 13A is selected as the error signal e in the control of the speaker 12A, and is selected as the reference signal r' in the control of the speaker 12B. The control of the speaker 12A and the control of the speaker 12B are executed simultaneously. Accordingly, the noise signal x output from the noise microphone 13A is used simultaneously as the error signal e and the reference signal r' (similar logic can be applied to the noise signals x output from the noise microphones 13B-13E).

Hereinafter, the noise microphones 13A-13E that generate the reference signals r' will be referred to as "the reference microphones 13*r*". The noise microphones 13A-13E that generate the error signal e will be referred to as "the error microphones 13*e*". As is clear from the above description, the noise microphones 13A-13E are used simultaneously as the reference microphone 13*r* and the error microphone 13*e*. A symbol C in FIG. 2 indicates transfer characteristics of the canceling sound y from each speaker 12A-12D to the error microphones 13*e* (transfer characteristics of a secondary path), and a symbol $C_H$ in FIG. 2 indicates transfer characteristics of the canceling sound y from each speaker 12A-12D to the reference microphones 13*r*. Symbols "ADA" in each figure (for example, FIG. 2) indicate "adaptive".

<The Howl Removal Units 22>

Each howl removal unit 22 of the controller 16 includes a howl filter unit 31, a polarity reversing unit 32, and an adder 33.

The howl filter unit 31 consists of a howl filter $\hat{C}_H$ ($\hat{C}1_H$, . . . , $\hat{C}n_H$). The howl filter $\hat{C}_H$ is a filter corresponding to an estimation value of the transfer characteristics $C_H$ of the canceling sound y from each speaker 12A-12D to the reference microphone 13*r*. A finite impulse response filter (FIR filter) or a single-frequency adaptive notch filter (SAN filter) may be used for the howl filter $\hat{C}_H$.

The howl filter unit 31 generates a howl signal yh (y1*h*, . . . , ynh) by filtering a control signal u (that will be described later) output from the adder 25. The howl signal yh is a signal corresponding to a component of the canceling sound y (more specifically, a component of the canceling sound y that is transmitted from each speaker 12A-12D to the reference microphones 13*r*). The howl filter unit 31 outputs the generated howl signal yh to the polarity reversing unit 32.

The polarity reversing unit 32 reverses the polarity of the howl signal yh output from the howl filter unit 31. The polarity reversing unit 32 outputs the howl signal yh with a reversed polarity to the adder 33.

The adder 33 generates a correction reference signal r (r1, . . . , rn) by adding together the reference signal r' output from the signal selection unit 21 and the howl signal yh output from the polarity reversing unit 32. The correction reference signal r is represented by the following formula (1). Incidentally, "*" in the following formula (1) indicates a convolution operation.

$$r=r'-yh=r'-u*\hat{C}_H \quad (1)$$

As is clear from the above formula (1), the correction reference signal r is a signal acquired by removing the component of the canceling sound y from the reference signal r'. The adder 33 outputs the generated correction reference signal r to the corresponding control signal output unit 23.

<The Control Signal Output Units 23>

Each control signal output unit 23 of the controller 16 corresponds to the correction reference signal r (r1, . . . , rn). The control signal output unit 23 includes a single control signal output unit 23A (a control signal output unit with fixed "C^") and K (K=n−1) pieces of control signal output units 23B (control signal output units that can learn "C^"). In another embodiment, the control signal output unit 23 may include a plurality of control signal output units 23A.

<The Control Signal Output Unit 23A>

The control signal output unit 23A includes a control filter unit 36, a secondary path filter unit 37, and a control update unit 38.

The control filter unit 36 consists of a control filter W1. An FIR filter or a SAN filter may be used for the control filter W1. The control filter unit 36 generates a control signal component u1' by filtering the correction reference signal r1. The control filter unit 36 outputs the generated control signal component u1' to the adder 25.

The secondary path filter unit 37 consists of a secondary path filter C^A (an example of an acoustic transmission filter and a non-adaptive update filter). The secondary path filter C^A is a filter corresponding to an estimation value of the transfer characteristics C of the canceling sound y from each speaker 12A-12D to the error microphone 13*e*. An FIR filter is used for the secondary path filter C^A. In another embodiment, a SAN filter may be used for the secondary path filter C^A. The secondary path filter unit 37 filters the correction reference signal r1, and outputs the filtered correction reference signal r1 to the control update unit 38.

The control update unit 38 adaptively updates the control filter W1 by using an adaptive algorithm such as a Least Mean Square algorithm (LMS algorithm). More specifically, the control update unit 38 updates the control filter W1 such that the error signal e output from the signal selection unit 21 is minimized.

<The Control Signal Output Units 23B>

Each control signal output unit 23B includes a control signal generation unit 41, a first canceling estimation signal generation unit 42, a noise estimation signal generation unit 43, a second canceling estimation signal generation unit 44, a control filter update unit 45, and a virtual error signal generation unit 46.

The control signal generation unit 41 consists of a control filter W (W2, . . . , Wn). An FIR filter or an SAN filter may be used for the control filter W. The control signal generation unit 41 generates a control signal component u' (u2', . . . , un') by filtering the correction reference signal r (r2, . . . , rn). The control signal generation unit 41 outputs the generated control signal component u' to the adder 25.

The first canceling estimation signal generation unit 42 includes a secondary path filter unit 51 and a secondary path update unit 52.

The secondary path filter unit 51 consists of a secondary path filter C^B (C^$B_1$, . . . , C^$B_K$: an example of an acoustic transmission filter and an adaptive update filter). The secondary path filter C^B is a filter corresponding to an estimation value of the transfer characteristics C of the canceling sound y from the speakers 12A-12D to the error microphone 13*e*. An FIR filter is used for the secondary path filter C^B. However, in another embodiment, a SAN filter may be used for the secondary path filter C^B.

The secondary path filter unit 51 generates a canceling estimation signal y^$_1$ by filtering the control signal component u'. The secondary path filter unit 51 outputs the generated canceling estimation signal y^$_1$ to the virtual error signal generation unit 46.

The secondary path update unit 52 adaptively updates the coefficients of the secondary path filter C^B by using an adaptive algorithm such as the LMS algorithm. More specifically, the secondary path update unit 52 updates the coefficients of the secondary path filter C^B such that a virtual error signal $e_1$ (that will be described later) output from the virtual error signal generation unit 46 is minimized.

The noise estimation signal generation unit 43 includes a primary path filter unit 54 and a primary path update unit 55.

The primary path filter unit 54 consists of a primary path filter H^ (H^$_1$, . . . , H^$_K$). The primary path filter H^ is a filter corresponding to an estimation value of the transfer characteristics of the noise d from the noise source to the error microphone 13*e*. An FIR filter is used for the primary path filter H^. In another embodiment, a SAN filter may be used for the primary path filter H^.

The primary path filter unit 54 generates a noise estimation signal d^ by filtering the correction reference signal r. The primary path filter unit 54 outputs the generated noise estimation signal d^ to the virtual error signal generation unit 46.

The primary path update unit 55 adaptively updates the coefficients of the primary path filter H^ by using an adaptive algorithm such as the LMS algorithm. More specifically, the primary path update unit 55 updates the coefficients of the primary path filter H^ such that the virtual error signal $e_1$ output from the virtual error signal generation unit 46 is minimized.

The second canceling estimation signal generation unit 44, like the first canceling estimation signal generation unit 42, consists of the secondary path filter C^B. When the coefficients of the secondary path filter C^B are updated in the first canceling estimation signal generation unit 42, the updated coefficients of the secondary path filter C^B are output to the second canceling estimation signal generation unit 44, and the coefficients of the secondary path filter C^B are updated in the second canceling estimation signal generation unit 44. That is, the coefficients of the secondary path filter C^B set in the second canceling estimation signal generation unit 44 are not fixed values but values that are successively updated based on the signal from the first canceling estimation signal generation unit 42.

The second canceling estimation signal generation unit 44 generates a canceling estimation signal y^$_2$ by filtering the correction reference signal r. The second canceling estimation signal generation unit 44 outputs the generated canceling estimation signal y^$_2$ to the control filter update unit 45.

The control filter update unit 45 includes a control filter unit 57 and a control update unit 58.

The control filter unit 57, like the control signal generation unit 41, consists of the control filter W (W2, . . . , Wn). The control filter unit 57 generates a canceling estimation signal y^ by filtering the canceling estimation signal $y\hat{}_2$ output from the second canceling estimation signal generation unit 44. The control filter unit 57 outputs the generated canceling estimation signal y^ to the virtual error signal generation unit 46.

The control update unit 58 updates the coefficients of the control filter W by using an adaptive algorithm such as the LMS algorithm. More specifically, the control update unit 58 updates the coefficients of the control filter W such that a virtual error signal $e_2$ (that will be described later) output from the virtual error signal generation unit 46 is minimized.

In this way, when the coefficients of the control filter W are updated in the control filter update unit 45, the updated coefficients of the control filter W are output to the control signal generation unit 41, and the coefficients of the control filter W are updated in the control signal generation unit 41. That is, the coefficients of the control filter W set in the control signal generation unit 41 are not fixed values but values that are successively updated based on the signal from the control filter update unit 45.

The virtual error signal generation unit 46 includes a first polarity reversing unit 61, a second polarity reversing unit 62, a first adder 63, and a second adder 64.

The first polarity reversing unit 61 reverses the polarity of the canceling estimation signal $y\hat{}_1$ output from the first canceling estimation signal generation unit 42. The second polarity reversing unit 62 reverses the polarity of the noise estimation signal d^ output from the noise estimation signal generation unit 43.

The first adder 63 generates the virtual error signal $e_1$ by adding together the error signal e, the canceling estimation signal $y\hat{}_1$ that has passed through the first polarity reversing unit 61, and the noise estimation signal d^ that has passed through the second polarity reversing unit 62. The first adder 63 outputs the generated virtual error signal $e_1$ to the first canceling estimation signal generation unit 42 and the noise estimation signal generation unit 43.

The second adder 64 generates the virtual error signal $e_2$ by adding together the noise estimation signal d^ output from the noise estimation signal generation unit 43 and the canceling estimation signal y output from the control filter update unit 45. The second adder 64 outputs the generated virtual error signal $e_2$ to the control filter update unit 45.

<The Adder 25>

The adder 25 of the controller 16 generates a control signal u of the speakers 12A-12D by adding together the control signal components u' (u1', . . . , un') output from the n pieces of control signal output units 23. The adder 25 outputs the generated control signal u to the speakers 12A-12D and the howl removal units 22. Accordingly, the speakers 12A-12D output the canceling sound y corresponding to the control signal u.

<The Estimation Value Calculation Unit 26>

The estimation value calculation unit 26 of the controller 16 calculates an estimation value of the secondary path filters C^B (hereinafter referred to as "C^B estimation value") based on update values of the secondary path filters C^B. The estimation value calculation unit 26 updates the secondary path filter C^A based on the calculated C^B estimation value. For example, the estimation value calculation unit 26 updates the secondary path filter C^A by copying the calculated C^B estimation value to the secondary path filter C^A. Hereinafter, calculation methods of the C^B estimation value by the estimation value calculation unit 26 will be described.

<The Calculation Method 1 of the C^B Estimation Value>

First, the estimation value calculation unit 26 acquires the update values of the K pieces of secondary path filters C^B (FIR filters in the present embodiment) from the secondary path filter units 51 of the control signal output units 23B. The update value of the k-th secondary path filter $C\hat{}B_k$ is represented by the following formula (2). Incidentally, "M" in the following formula (2) indicates the number of coefficients of the secondary path filter C^B.

$$\hat{C}B_k=[\hat{C}B_{k,1},\hat{C}B_{k,2}, \ldots \hat{C}B_{k,M}]^T \tag{2}$$

The estimation value calculation unit 26 calculates the C^B estimation value by applying an averaging process to the update values of the K pieces of secondary path filters C^B. For example, the estimation value calculation unit 26 calculates the m-th (m=1, . . . , M) coefficient $C\hat{}B_m$ of the C^B estimation value by the following formula (3). Incidentally, $a_k$ in the following formula (3) indicates a weighting coefficient.

$$\hat{C}B_m = \sum_{k=1}^{K} a_k \hat{C}B_{k,m} \tag{3}$$

For example, the estimation value calculation unit 26 may fix the weighting coefficient $a_k$ to 1/K. Accordingly, the m-th coefficient $C\hat{}B_m$ of the C^B estimation value is a simple average value of the coefficients of the K pieces of secondary path filters C^B. Alternatively, the estimation value calculation unit 26 may change the weighting coefficient $a_k$ according to the control channel (the error microphone 13*e* to be controlled). Accordingly, the m-th coefficient $C\hat{}B_m$ of the C^B estimation value is a weighted average of the coefficients of the K pieces of secondary path filters C^B.

<The Calculation Method 2 of the C^B Estimation Value>

Figure 3:
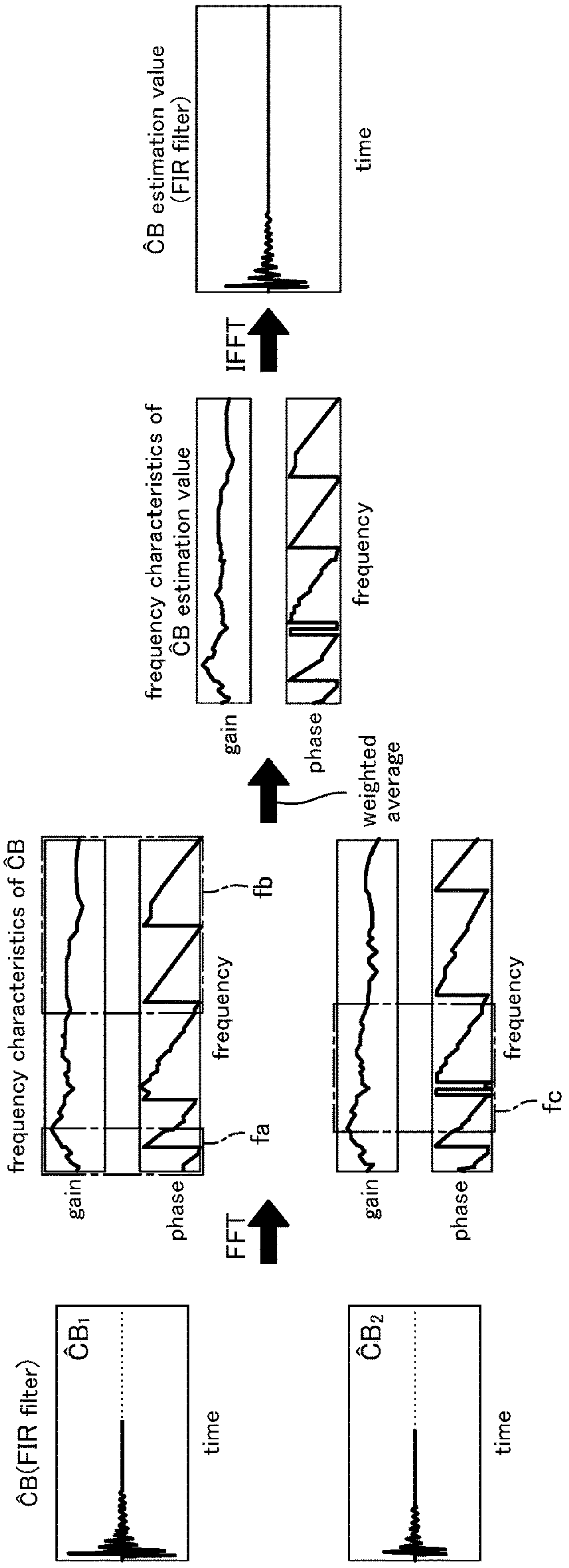
FIG. 3 is an explanatory diagram showing a calculation method 2 of a C^B estimation value according to the first embodiment.

With reference to FIG. 3, the estimation value calculation unit 26 first acquires the update values of the K pieces of secondary path filters C^B (FIR filters in the present embodiment) from the secondary path filter units 51 of the control signal output units 23B. In FIG. 3, the number of secondary path filters C^B is set to two for simplification of explanation.

Next, the estimation value calculation unit 26 performs a fast Fourier transform (FFT) on the K pieces of secondary path filters C^B. Thus, the estimation value calculation unit 26 calculates frequency characteristics of the K pieces of secondary path filters C^B.

Next, the estimation value calculation unit 26 calculates the frequency characteristics $C\hat{}B_f$ of the C^B estimation value by applying an averaging process to the frequency characteristics of the secondary path filters C^B. For example, the estimation value calculation unit 26 calculates the frequency characteristics $C\hat{}B_f$ of the C^B estimation value by the following formula (4). Incidentally, "$a_{k,f}$" in the following formula (4) indicates a weighting coefficient.

$$\hat{C}B_f = \sum_{k=1}^{K} a_{k,f} \hat{C}B_{k,f} \tag{4}$$

When the positions of the reference microphones 13*r* and the error microphone 13*e* are determined, the relationships between the reference microphones 13*r* and the error microphone 13*e* are also determined. Accordingly, the reference microphone 13*r* with high calculation accuracy of the C^B estimation value can be determined for each frequency band of the error microphone 13*e*. Accordingly, the weighting coefficient $a_{k,f}$ of the secondary path filter C^B, which corresponds to the reference microphone 13*r* with high accuracy in calculating the C^B estimation value, may be set large for each frequency band of the error microphone 13*e*. Thus, the C^B estimation value can be calculated accurately in all the frequency bands of the error microphone 13*e*. For example, in FIG. 3, the weighting coefficient $a_{k,f}$ corresponding to the secondary path filter $C\hat{}B_1$ is set large in the frequency bands fa and fb, while the weighting coefficient $a_{k,f}$ corresponding to the secondary path filter $C\hat{}B_2$ is set large in the frequency band fc.

Finally, the estimation value calculation unit 26 performs an inverse fast Fourier transform (IFFT) on the frequency characteristics $C\hat{}B_f$ of the C^B estimation value. Thus, the estimation value calculation unit 26 calculates the C^B estimation value corresponding to the FIR filter.

<The Calculation Method 3 of the C^B Estimation Value>

Figure 4:
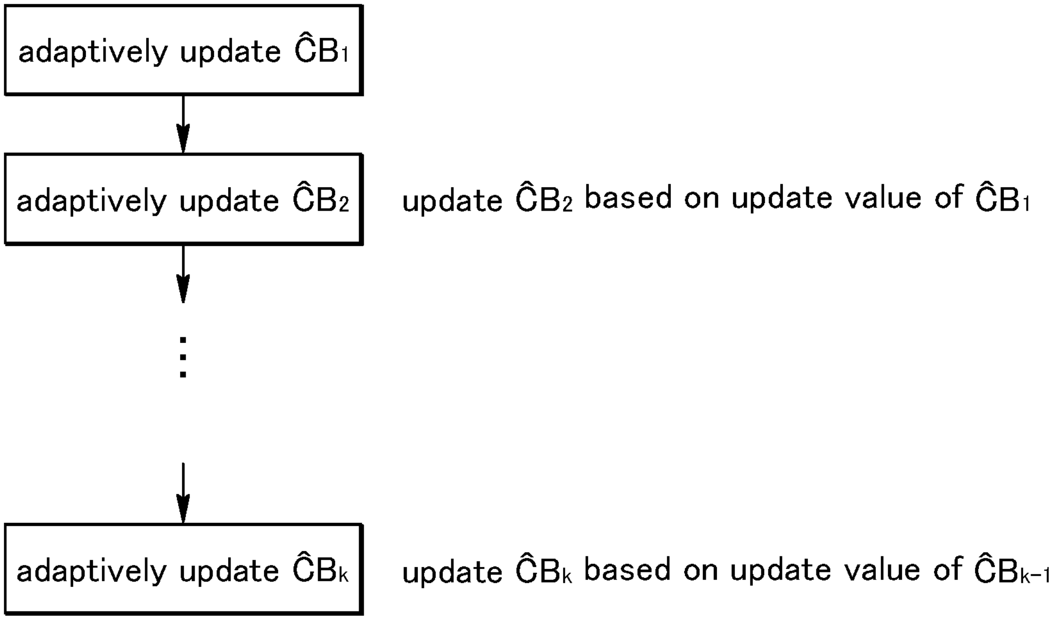
FIG. 4 is an explanatory diagram showing a calculation method 3 of the C^B estimation value according to the first embodiment.

With reference to FIG. 4, the secondary path update unit 52 corresponding to the secondary path filter $C\hat{}B_1$ adaptively updates the secondary path filter $C\hat{}B_1$. Next, the secondary path update unit 52 corresponding to the secondary path filter $C\hat{}B_2$ adaptively updates the secondary path filter $C\hat{}B_2$ based on the update value of the secondary path filter $C\hat{}B_1$.

In this way, the secondary path update unit 52 repeats the process of adaptively updating the secondary path filter $C\hat{}B_k$ based on the update value of the secondary path filter $C\hat{}B_{k-1}$ (the previous update value of the secondary path filter C^B). At this time, the secondary path update unit 52 calculates the update value of the secondary path filter $C\hat{}B_k$ by the following formula (5). Incidentally, "t" in the following formula (5) indicates a discrete time, "μ" in following formula (5) indicates a step size parameter (a parameter for adjusting an update amount of the secondary path filter $C\hat{}B_k$), and "*" in the following formula (5) indicates a convolution operation.

$$\hat{C}B_k(t)=\hat{C}B_{k-1}(t)-\mu\times e(t)\times(r(t)*W(t)) \quad (5)$$

When the secondary path filter $C\hat{}B_k$ is adaptively updated in this way, the update value of the secondary path filter $C\hat{}B_k$ is output to the estimation value calculation unit 26. The estimation value calculation unit 26 calculates the C^B estimation value based on the update value of the secondary path filter $C\hat{}B_k$. For example, the estimation value calculation unit 26 may set the update value itself of the secondary path filter $C\hat{}B_k$ as the C^B estimation value. Alternatively, similar to the calculation methods 1 and 2 of the C^B estimation value, the estimation value calculation unit 26 may calculate the C^B estimation value by applying the averaging process to the update values of the K pieces of secondary path filters C^B including the update value of the secondary path filter $C\hat{}B_k$.

The Effect of the First Embodiment

As described above, the controller 16 acquires the plurality of noise signals x output from the plurality of noise microphones 13A-13E, selects the plurality of reference signals r' (that corresponds to the noise d) and the error signal e (that corresponds to the error between the noise d and the canceling sound y) from among the plurality of noise signals x, generates the control signal u of the speakers 12A-12D from the plurality of reference signals r' by using the plurality of control filters W, and adaptively updates the plurality of control filters W by using the plurality of secondary path filters C^A and C^B. In other words, the active noise reduction program stored in the storage device 16*b*, when executed by the processing device 16*a*, executes an active noise reduction method described above. Thus, both the reference signals r' and the error signal e can be generated by using the plurality of noise microphones 13A-13E. Accordingly, it is not necessary to use an expensive sensor such as an acceleration sensor to generate the reference signals r', so that an inexpensive noise reduction system 11 can be provided.

By the way, in the present embodiment, the plurality of noise microphones 13A-13E include only one error microphone 13*e*. Accordingly, the transfer characteristics C of the canceling sound y from the speakers 12A to 12D to the error microphone 13*e* is determined. Accordingly, the values of the secondary path filters C^A, C^B, which correspond to the estimation value of the transfer characteristics C of the canceling sound y from the speakers 12A-12D to the error microphone 13*e*, may theoretically be the same.

Accordingly, the controller 16 adaptively updates the secondary path filters C^B, and thus updates the secondary path filter C^A by using the adaptively updated secondary path filters C^B. In other words, the controller 16 causes some control channels to learn "C^", and uses C^ learned in these control channels for another control channel. Accordingly, it is possible to suppress the calculation amount (calculation load) of the controller 16 while allowing the secondary path filters C^A and C^B to be updated.

By the way, in the actual space, high portions (portions with a high sound pressure level) and low portions (portions with a low sound pressure level) are generated in the frequency characteristics of the reference signal r' generated by each reference microphone 13*r* depending on the position in the vehicle cabin 2 of the reference microphone 13*r*. In particular, in the low portions of the frequency characteristics of the reference signal r', the update accuracy of each secondary path filter C^B tends to deteriorate as the sound pressure level is low. If the secondary path filter C^A is updated based only on the secondary path filter C^B with low update accuracy, the control performance of the noise reduction system 11 may deteriorate.

As such, the controller 16 updates the secondary path filter C^A based on the plurality of secondary path filters C^B that have been updated adaptively. In other words, the controller 16 updates the secondary path filter C^A by using the reference signals r' from the plurality of reference microphones 13*r* arranged at different positions. Accordingly, the low portions of the frequency characteristics of one reference signal r' can be compensated by the high portions of the frequency characteristics of another reference signal r'. Accordingly, it is possible to prevent the secondary path filter C^A from being updated based only on the secondary path filter C^B for which the update accuracy deteriorates, so that the control performance of the noise reduction system 11 can be improved.

Figure 5:
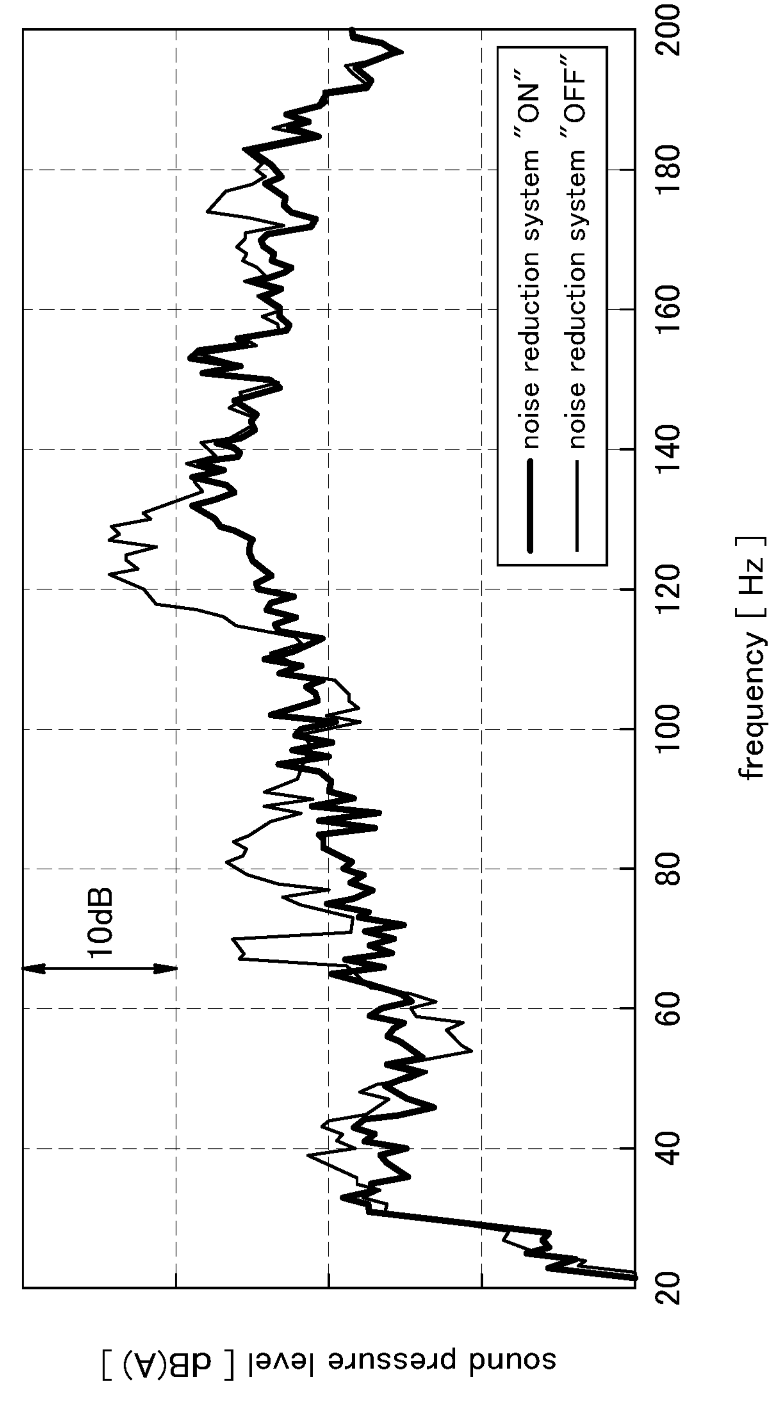
FIG. 5 is a graph showing the effect of reducing a noise.

FIG. 5 is a graph showing the effect of reducing the noise d. As shown in FIG. 5, when the noise reduction system 11 is ON, the noise d can be reduced effectively as compared with a case where the noise reduction system 11 is OFF.

The Second Embodiment

Next, the second embodiment of the present invention will be described with reference to FIGS. 6 and 7. Explanations that overlap with those of the first embodiment of the present invention will be omitted as appropriate.

<The Active Noise Reduction System 71>

Figure 6:
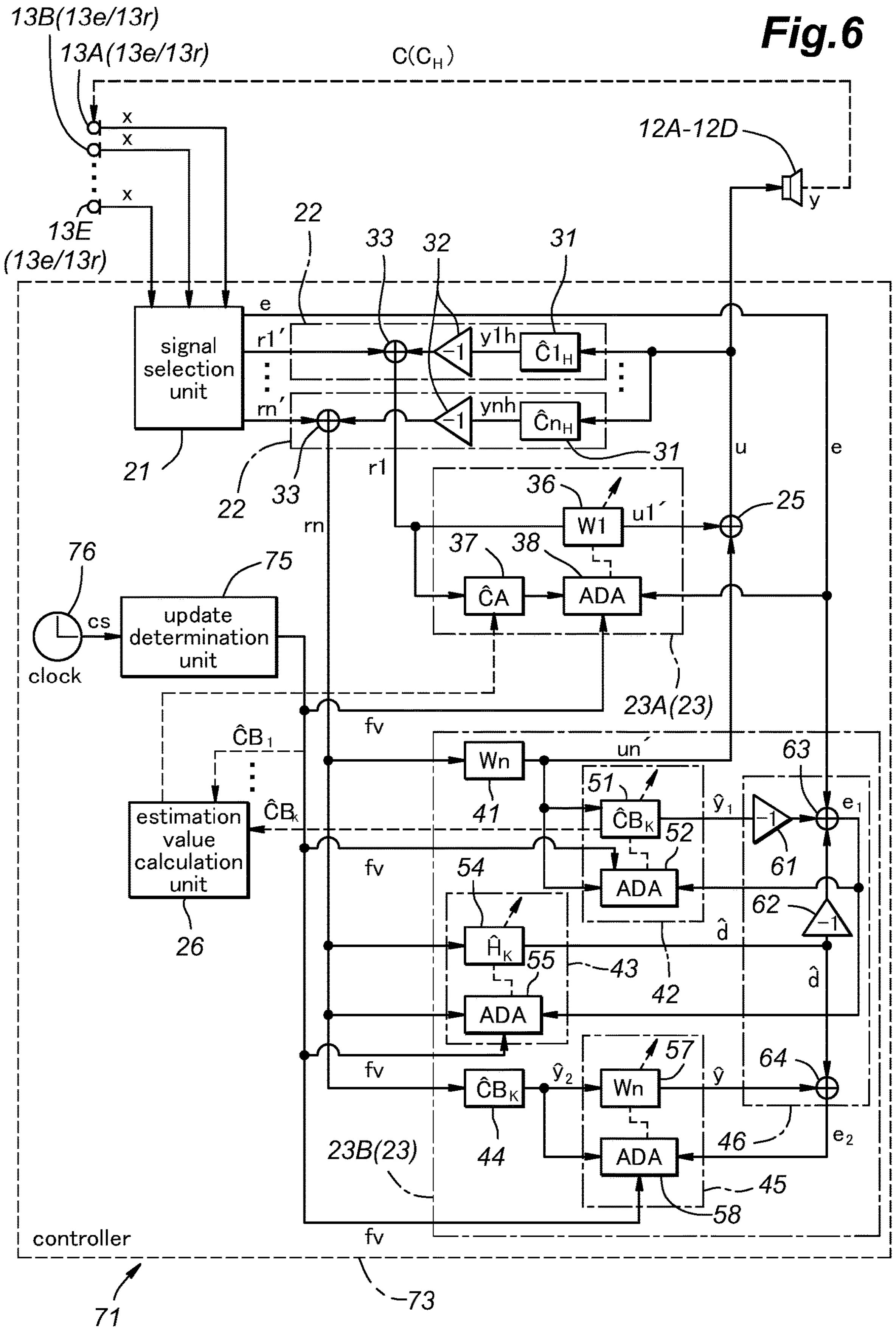
FIG. 6 is a functional block diagram showing an active noise reduction system according to the second embodiment.

FIG. 6 is a functional block diagram showing an active noise reduction system 71 (hereinafter abbreviated as "noise reduction system 71") according to the second embodiment. In the noise reduction system 71 according to the second embodiment, the components other than an update determination unit 75 of a controller 73 are the same as those of the noise reduction system 11 according to the first embodiment. Accordingly, descriptions of these components will be omitted.

<The Update Determination Unit 75>

The update determination unit 75 of the controller 73 classifies adaptively updatable filters (in the present embodiment, the control filter W, the primary path filter H^, and the secondary path filter C^B: hereinafter collectively referred to as "updatable filters") into P (P≥2) pieces of filter groups, and determines an update order of the filter groups. Hereinafter, a method of determining the update order of the filter groups by the update determination unit 75 will be described.

With reference to FIG. 7, the update determination unit 75 stores an update order table T1. The update order table T1 is a table that defines the relationship between the number (1, 2, . . . , P) of each filter group and the updatable filters included in the corresponding filter group.

With reference to FIG. 6, by counting the clock signals cs output at prescribed time intervals from a clock 76, the update determination unit 75 calculates a count value clk of each clock signal cs. The update determination unit 75 determines, based on the count value clk of each clock signal cs, the filter group (hereinafter referred to as "update filter group") for which the updatable filters will be updated adaptively. For example, the update determination unit 75 determines the update filter group by the following formula (6). Incidentally, "p" in the following formula (6) indicates the number of the update filter group, and "%" in the following formula (6) indicates the remainder calculation.

$$p = \text{clk} \ \% \ P + 1 \tag{6}$$

For example, if the number P of the filter group is 20 and the count value clk of the clock 76 is 41, the number p of the update filter group is calculated as p=41% 20+1=2 according to the above formula (6). Accordingly, the update determination unit 75 determines the filter group having the number "2" as the update filter group.

The update determination unit 75 transmits a flag value fv (1 or 0) according to the update filter group to the update units of the updatable filters (in the present embodiment, the control update unit 38, the secondary path update unit 52, the primary path update unit 55, and the control update unit 58: hereinafter collectively referred to as "adaptive update units"). More specifically, the update determination unit 75 transmits "1" as the flag value fv to the adaptive update units of the updatable filters that are included in the update filter group. On the other hand, the update determination unit 75 transmits "0" as the flag value fv to the adaptive update units of the updatable filters that are not included in the update filter group.

Upon receiving "1" as the flag value fv from the update determination unit 75, the adaptive update units of the updatable filters adaptively update the corresponding updatable filters. On the other hand, upon receiving "0" as the flag value fv from the update determination unit 75, the adaptive update units of the updatable filters wait without adaptively updating the corresponding updatable filters.

With reference to FIG. 7, for example, if the filter group having the number "2" is the update filter group, the update determination unit 75 transmits "1" as the flag value fv to the primary path update unit 55 of the primary path filter $H^{\wedge}_1$ and the secondary path update unit 52 of the secondary path filter $C^{\wedge}B_1$. Accordingly, the primary path update unit 55 adaptively updates the primary path filter $H^{\wedge}_1$, and the secondary path update unit 52 adaptively updates the secondary path filter $C^{\wedge}B_1$. By contrast, the update determination unit 75 transmits "0" as the flag value fv to the adaptive update units other than the abovementioned two adaptive update units. Accordingly, the adaptive update units other than the abovementioned two adaptive update units wait without adaptively updating the corresponding updatable filters.

The Effect of the Second Embodiment

The controller 73 classifies the updatable filters into the plurality of filter groups, and thus adaptively updates the updatable filters for each filter group in the prescribed update order. Accordingly, the update frequency of the updatable filters can be reduced as compared with a case where all the updatable filters are adaptively updated each time. Accordingly, the calculation amount of the controller 73 can be further reduced.

The Modification of the Second Embodiment

In the second embodiment, the control filter W, the primary path filter H^, and the secondary path filter C^B are set to the updatable filters. In another embodiment, the howl filter $C^{\wedge}_H$ may be adaptively updated and included in the updatable filters. In this case, the update determination unit 75 may set the update order table T1 such that not only the control filter W, the primary path filter H^, and the secondary path filter C^B but also the howl filter $C^{\wedge}_H$ is included in the filter groups.

The Third Embodiment

Next, the third embodiment of the present invention will be described with reference to FIGS. 8 and 9. The contents other than variation determination control executed by the update determination unit 75 of the controller 73 are the same as those of the second embodiment. Accordingly, descriptions of these contents will be omitted.

If the updatable filters are adaptively updated for each filter group as described in the second embodiment, the learning frequency of the acoustic transmission characteristics (for example, the transmission characteristics of the noise d and the canceling sound y from the speakers 12A-12D to the error microphone 13*e*) may decrease. Even if the learning frequency of the acoustic transmission characteristics decreases in this way, the updatable filters may be adaptively updated at intervals of several milliseconds. For example, if the sampling frequency is 5 kHz and the number P of filter groups is 20, the update intervals of the updatable filters included in one filter group are 4 ms. Accordingly, even if the learning frequency of the acoustic transmission characteristics decreases, the influence on the control effect (that is, the effect of reducing the noise d) of the noise reduction system 71 is considered to be small.

Anyway, if the learning frequency of the acoustic transmission characteristics decreases, the ability to follow the change in the acoustic transmission characteristics may deteriorate. As such, the update determination unit 75 suppresses the deterioration of the ability to follow the change in the acoustic transmission characteristics by executing the following variation determination control.

<The Variation Determination Control>

Figure 8:
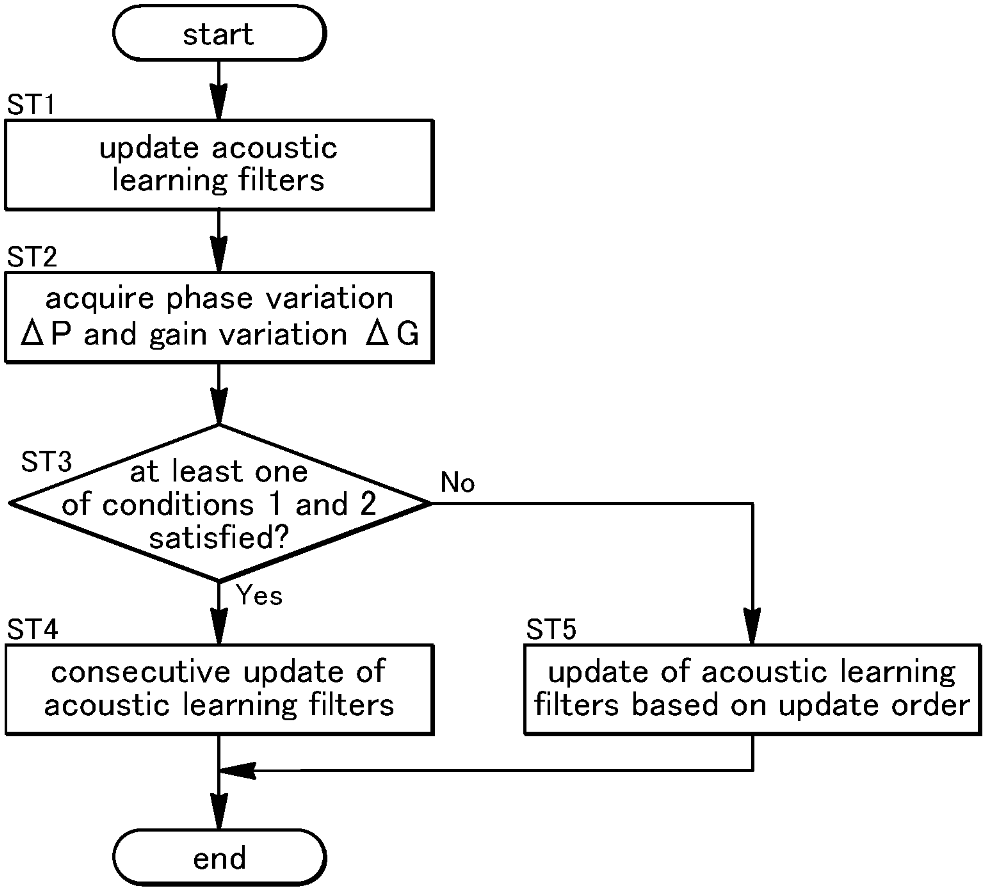
FIG. 8 is a flowchart showing variation determination control according to the third embodiment.
Figure 9:
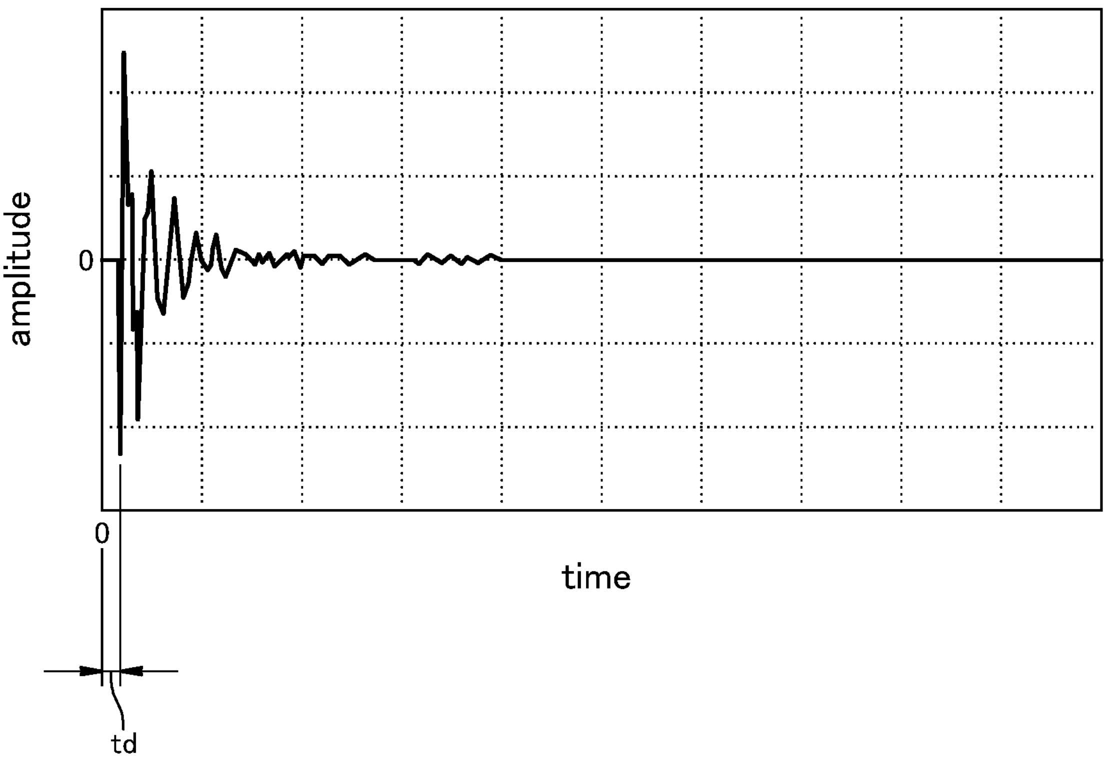
FIG. 9 is a graph showing the definition of a delay time td according to the third embodiment.

With reference to FIG. 8, when the primary path filter H^ and the secondary path filter C^B (hereinafter collectively referred to as "acoustic learning filters") are updated adaptively (step ST1), the update determination unit 75 acquires a phase variation ΔP and a gain variation ΔG of the acoustic learning filters in one adaptive update (one sample) thereof (step ST2). For example, the update determination unit 75 acquires a delay time td (see FIG. 9) of the impulse response of the acoustic learning filters (FIR filters in the present embodiment) as the phase variation ΔP of the acoustic learning filters. Also, the update determination unit 75 acquires the variation of the sum of squares of the coefficients of the acoustic learning filters as the gain variation ΔG of the acoustic learning filters.

Next, the update determination unit 75 determines whether at least one of the following conditions 1 and 2 is satisfied (step ST3).

<Condition 1>

The phase variation ΔP of the acoustic learning filters in the one adaptive update exceeds a prescribed phase threshold.

<Condition 2>

The gain variation ΔG of the acoustic learning filters in the one adaptive update exceeds a prescribed gain threshold.

In a case where at least one of the above conditions 1 and 2 is satisfied (step ST3: Yes), the update determination unit 75 estimates that the acoustic transmission characteristics have changed significantly. Accordingly, the update determination unit 75 adaptively updates the acoustic learning filters consecutively for a prescribed period (for a prescribed number of samples) regardless of the update order of the filter groups (step ST4).

On the other hand, if neither of the above conditions 1 and 2 is satisfied (step ST3: No), the update determination unit 75 estimates that the acoustic transmission characteristics have not changed significantly. Accordingly, the update determination unit 75 adaptively updates the acoustic learning filters based on the update order of the filter group (step ST5).

The Effect of the Third Embodiment

In a case where the variation (the phase variation ΔP or the gain variation ΔG) of the acoustic learning filters in one adaptive update thereof exceeds the prescribed threshold, the controller 73 adaptively updates the acoustic learning filters consecutively for a prescribed period regardless of the update order. Accordingly, it is possible to suppress the deterioration of the ability to follow the change in the acoustic transmission characteristics due to the decrease in the update frequency of the acoustic learning filters.

The Fourth Embodiment

Next, the fourth embodiment of the present invention will be described with reference to FIGS. 10 and 11. Explanations that overlap with those of the second embodiment of the present invention will be omitted as appropriate.

<The Active Noise Reduction System 81>

Figure 10:
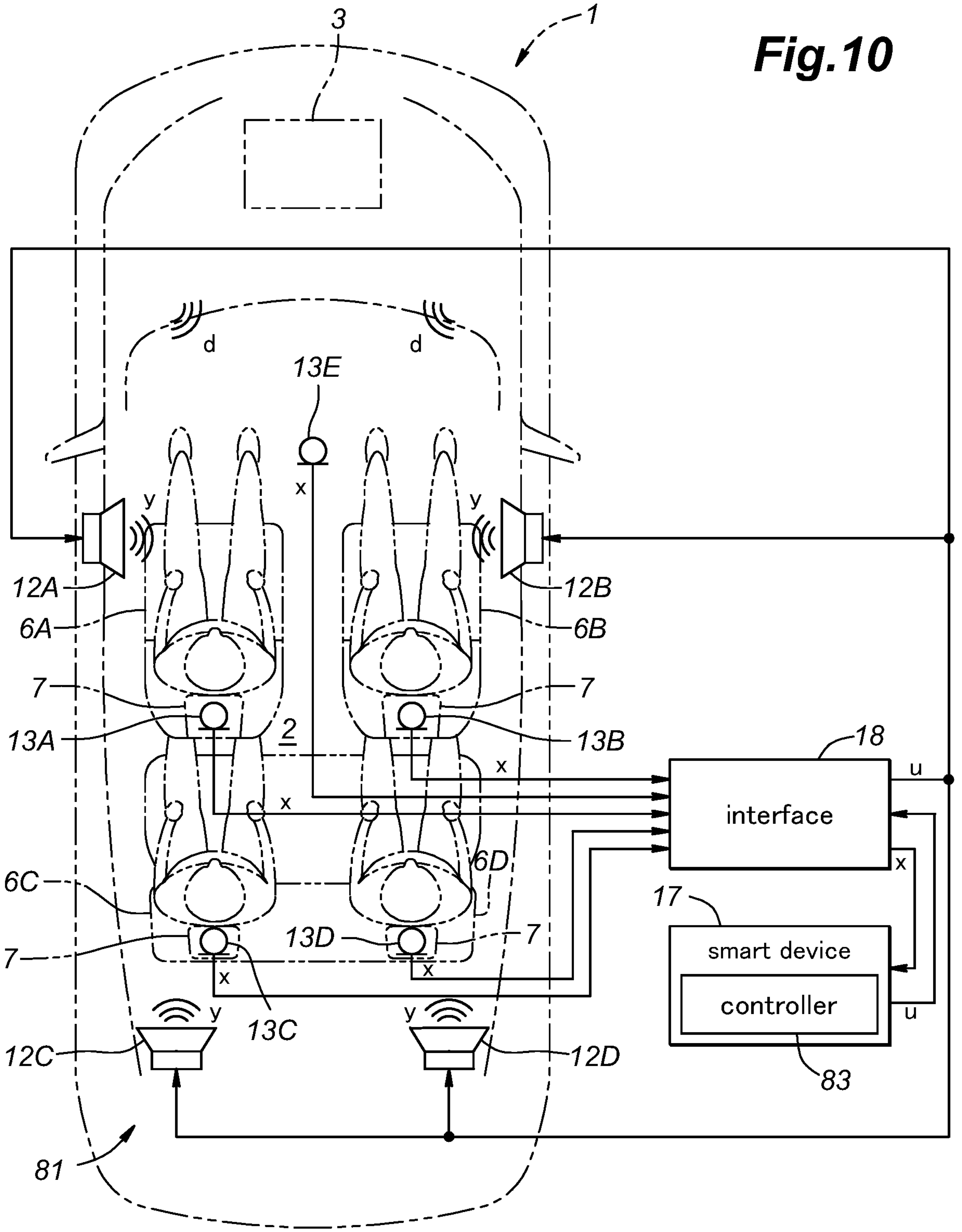
FIG. 10 is a schematic diagram showing a vehicle to which an active noise reduction system according to the fourth embodiment is applied.

FIG. 10 is a schematic diagram showing a vehicle 1 to which an active noise reduction system 81 (hereinafter abbreviated as "noise reduction system 81") according to the fourth embodiment is applied. In the noise reduction system 81 according to the fourth embodiment, the components other than the controller 83 are the same as those of the noise reduction system 71 according to the second embodiment. Accordingly, descriptions of these components will be omitted.

<The Controller 83>

With reference to FIG. 10, the controller 83 of the noise reduction system 81 is installed in a smart device 17 (an example of a portable terminal) configured to be taken outside the vehicle 1. More specifically, the controller 83 is realized by an active noise reduction program (active noise reduction application) executed on an OS of the smart device 17. The smart device 17 consists of a smart phone, for example.

The controller 83 acquires buffer data in which the noise signals x are stored in a time series, and processes the noise signals x for each buffer data. That is, the controller 83 adopts a method of processing signals similar to that of a smart device.

The controller 83 is connected to an interface 18 provided in the vehicle 1, and is connected to the speakers 12A-12D and the noise microphones 13A-13E via the interface 18. The interface 18 may be a wired interface such as USB, or a wireless interface such as Bluetooth™.

The components of the controller 83 are the same as those of the controller 73 according to the second embodiment. Accordingly, the descriptions of the components of the controller 83 will be omitted. Hereinafter, update suspension control executed by the update determination unit 75 of the controller 83 will be described.

<The Update Suspension Control>

Figure 11:
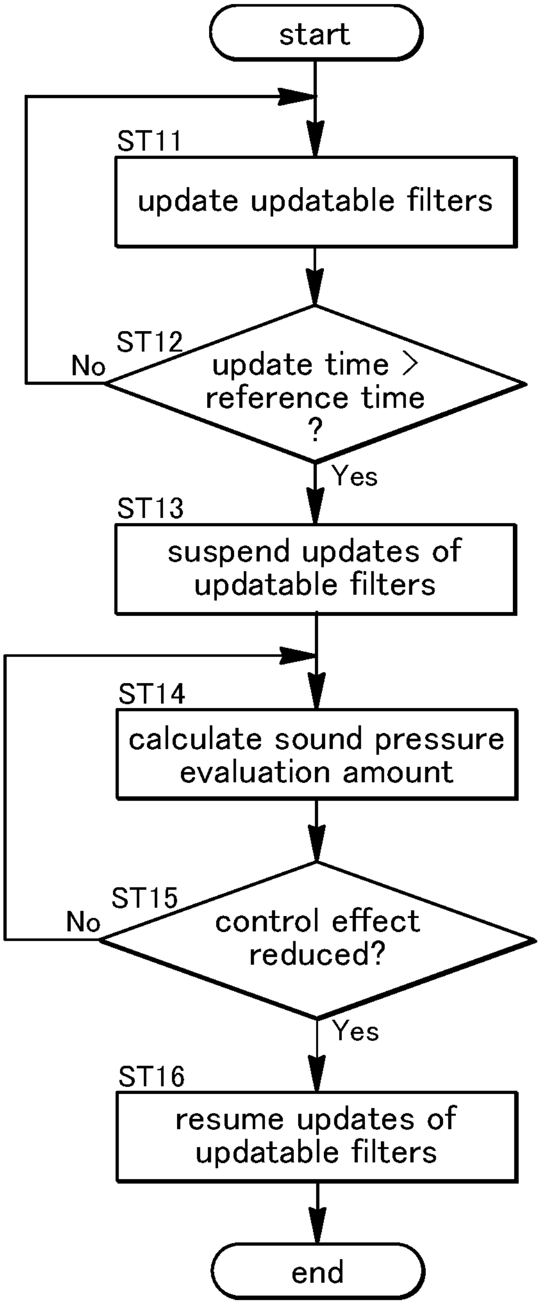
FIG. 11 is a flowchart showing update suspension control according to the fourth embodiment.

With reference to FIG. 11, when the updatable filters are adaptively updated (step ST11), the update determination unit 75 determines whether the elapsed time (hereinafter referred to as "update time of the updatable filters") from the start of the adaptive update of the updatable filters exceeds a prescribed reference time (step ST12).

In a case where the update time of the updatable filters is equal to or less than the reference time (step ST12: No), it is probable that the update time of the updatable filters is insufficient (learning of the acoustic transmission characteristics is insufficient). Accordingly, the updatable filters are again updated adaptively in step ST11.

By contrast, in a case where the update time of the updatable filters exceeds the reference time (step ST12: Yes), it is probable that the update time of the updatable filters is sufficient (learning of the acoustic transmission characteristics is sufficient). Accordingly, the update determination unit 75 suspends the adaptive update of the updatable filters (step ST13).

Next, the update determination unit 75 calculates the current sound pressure evaluation amount J(n) based on the following formula (7) (step ST14). Incidentally, "J(n−1)" in the following formula (7) indicates the previous sound pressure evaluation amount, "β" in the following formula (7) indicates an averaging coefficient, "e(n)" in the following formula (7) indicates the current error signal e, and "L" in the following formula (7) indicates the number of error signals e.

$$J(n) = J(n-1) + \beta\sum_{n=1}^{L} e(n)^2 \qquad (7)$$

As is clear from the above formula (7), the current sound pressure evaluation amount J(n) is calculated by adding together the previous sound pressure evaluation amount J(n−1) and the temporal average of the sum of squares of the current error signal e(n).

Next, the update determination unit 75 determines whether the control effect (that is, the effect of reducing noise d) of the noise reduction system 81 is reduced based on the current sound pressure evaluation amount J(n) (step ST15). For example, in a case where at least one of the following conditions A and B is satisfied, the update determination unit 75 determines that the control effect of the noise reduction system 81 is reduced. By contrast, in a case where neither of the following conditions A and B is satisfied, the update determination unit 75 determines that the control effect of the noise reduction system 81 is reduced.

<Condition A>

The current sound pressure evaluation amount J(n) is greater than a prescribed first threshold.

<Condition B>

The difference between the current sound pressure evaluation amount J(n) and the previous sound pressure evaluation amount J(n-ΔN) is greater than a prescribed second threshold.

Upon determining that the control effect of the noise reduction system 81 is not reduced (step ST15: No), the update determination unit 75 again calculates the current sound pressure evaluation amount J(n) in step ST14 while suspending the adaptive updates of the updatable filters.

By contrast, upon determining that the control effect of the noise reduction system 81 is reduced (step ST15: Yes), the update determination unit 75 resumes the adaptive updates of the updatable filters (step ST16), and ends the update suspension control.

The Effect of the Fourth Embodiment

Figure 12:
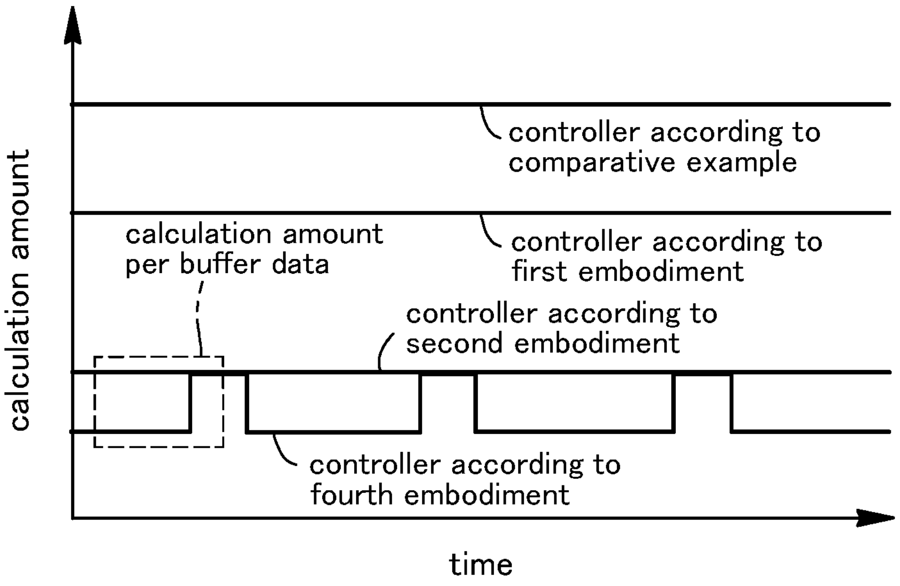
FIG. 12 is a graph showing the calculation amounts of controllers according to a comparative example and the first, second, and fourth embodiments.

FIG. 12 is a graph showing the calculation amount of the controller (not shown) according to a comparative example and the controllers 16, 73, and 83 according to the first, second and fourth embodiments.

The controller according to the comparative example adaptively updates all the secondary path filters C^. By contrast, the controller 16 according to the first embodiment adaptively updates only a part (that is, the secondary path filters C^B) of the secondary path filters C^. Accordingly, the calculation amount of the controller 16 according to the first embodiment is reduced as compared with the controller according to the comparative example.

Further, the controller 16 according to the first embodiment adaptively updates all the updatable filters each time. By contrast, the controller 73 according to the second embodiment adaptively updates only the updatable filters included in the update filter group. Accordingly, the calculation amount of the controller 73 according to the second embodiment is reduced as compared with that of the controller 16 according to the first embodiment.

Furthermore, the controller 73 according to the second embodiment adaptively updates the updatable filters constantly. On the other hand, the controller 83 according to the fourth embodiment temporarily suspends the adaptive update of the updatable filters. Accordingly, the calculation amount per buffer data of the controller 83 according to the fourth embodiment is smaller than that of the controller 73 according to the second embodiment. That is, by adopting the configurations of the fourth embodiment, the calculation amount of the controller 83 can be greatly reduced in the method of processing signals similar to that of a smart device.

The Modification of the Fourth Embodiment

In the fourth embodiment, the controller 83 is installed in the smart device 17 (an example of a portable terminal) configured to be taken outside the vehicle 1. In the modification of the fourth embodiment, the controller 83 may be installed in an onboard system (not shown) arranged in the vehicle 1. More specifically, the controller 83 may be realized by an active noise reduction program (active noise reduction application) executed on an OS of the onboard system.

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:

a canceling sound output device configured to output a canceling sound for canceling a noise;

a plurality of noise microphones configured to generate a plurality of noise signals based on the noise; and a controller configured to control the canceling sound output device based on the plurality of noise signals, wherein the controller is configured to:

acquire the plurality of noise signals output from the plurality of noise microphones;

select a plurality of reference signals and an error signal from among the plurality of noise signals, the plurality of reference signals corresponding to the noise, the error signal corresponding to an error between the noise and the canceling sound;

generate a control signal of the canceling sound output device from the plurality of reference signals by using a plurality of control filters; and adaptively update the plurality of control filters by using a plurality of acoustic transmission filters, and the plurality of acoustic transmission filters includes:

at least one adaptive update filter configured to be adaptively updated; and at least one non-adaptive update filter configured to be updated based on an update value of the adaptive update filter.

2. The active noise reduction system according to claim 1, wherein the at least one adaptive update filter comprises a plurality of adaptive update filters, and the controller is configured to:

calculate estimation values of the plurality of adaptive update filters by applying a prescribed averaging process to update values of the plurality of adaptive update filters; and update the non-adaptive update filter based on the estimation values of the plurality of adaptive update filters.

3. The active noise reduction system according to claim 1, wherein the at least one adaptive update filter comprises a plurality of adaptive update filters, and the controller is configured to adaptively update one of the plurality of adaptive update filters based on an update value of another of the plurality of adaptive update filters.

4. The active noise reduction system according to claim 1, wherein the controller is configured to:

classify the plurality of control filters and the adaptive update filter into a plurality of filter groups; and adaptively update the plurality of control filters and the adaptive update filter for each of the plurality of filter groups in a prescribed update order.

5. The active noise reduction system according to claim 4, wherein in a case where a variation of the adaptive update filter in one adaptive update thereof exceeds a prescribed threshold, the controller adaptively updates the adaptive update filter consecutively for a prescribed period regardless of the update order.

6. The active noise reduction system according to claim 1, wherein the controller is configured to:

suspend adaptive updates of the plurality of control filters and the adaptive update filter after adaptively updating the plurality of control filters and the adaptive update filter for a prescribed period;

determine whether a control effect of the noise is reduced based on the error signal while suspending the adaptive updates of the plurality of control filters and the adaptive update filter; and resume the adaptive updates of the plurality of control filters and the adaptive update filter upon determining that the control effect of the noise is reduced.

7. The active noise reduction system according to claim 6, wherein the controller is configured to:

acquire buffer data in which the noise signals are stored in a time series, and process the noise signals for each of the buffer data.

8. An active noise reduction method, comprising:

acquiring a plurality of noise signals output from a plurality of noise microphones;

selecting a plurality of reference signals and an error signal from among the plurality of noise signals, the plurality of reference signals corresponding to a noise, the error signal corresponding to an error between the noise and a canceling sound;

generating a control signal of the canceling sound from the plurality of reference signals by using a plurality of control filters; and adaptively updating the plurality of control filters by using a plurality of acoustic transmission filters including:

at least one adaptive update filter configured to be adaptively updated; and at least one non-adaptive update filter configured to be updated based on an update value of the adaptive update filter.

9. A non-transitory computer-readable storage medium comprising an active noise reduction program, wherein the active noise reduction program, when executed by a processor, executes an active noise reduction method comprising:

acquiring a plurality of noise signals output from a plurality of noise microphones;

selecting a plurality of reference signals and an error signal from among the plurality of noise signals, the plurality of reference signals corresponding to a noise, the error signal corresponding to an error between the noise and a canceling sound;

generating a control signal of the canceling sound from the plurality of reference signals by using a plurality of control filters; and adaptively updating the plurality of control filters by using a plurality of acoustic transmission filters including:

at least one adaptive update filter configured to be adaptively updated; and at least one non-adaptive update filter configured to be updated based on an update value of the adaptive update filter.

* * * * *